S. CARPENTER.
Horse Rake.
No. 71,579.
Patented Dec. 3, 1867.
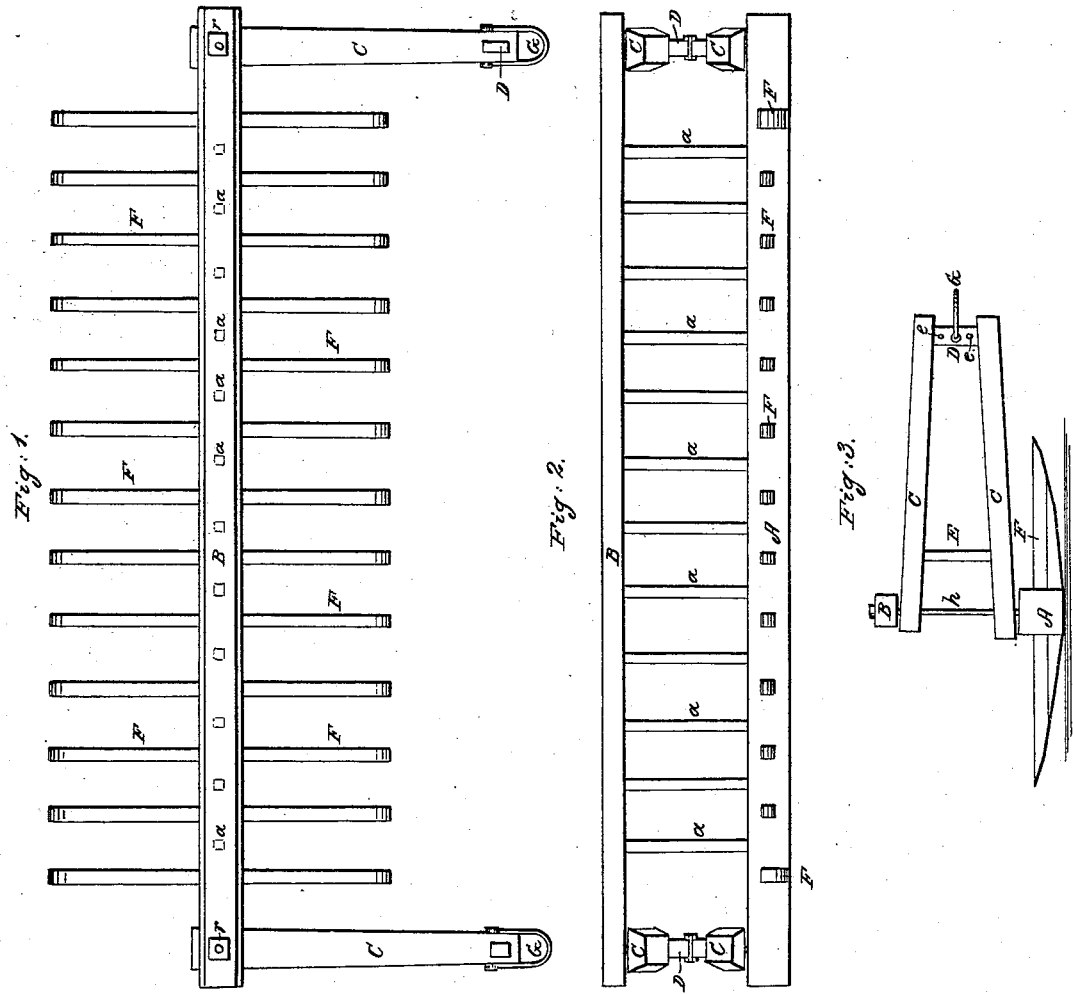
Witnesses:
J. H. Clark
U. Johnson
Inventor:
Samuel Carpenter
by Coburn Maus.
Attorneys.

UNITED STATES PATENT OFFICE.

SAMUEL CARPENTER, OF BROOKFIELD, ILLINOIS.

IMPROVEMENT IN HORSE-RAKES.

Specification forming part of Letters Patent No. 71,579, dated December 3, 1867.

*To all whom it may concern:*

Be it known that I, SAMUEL CARPENTER, of Brookfield, in the county of La Salle and State of Illinois, have invented a new and useful Improved Hay-Gatherer; and I do hereby declare and make known that the following is a full, clear, and exact description of the same, reference being had to the accompanying drawings, and the letters and figures marked thereon, which form part of this specification.

My invention consists in a cheap, simple, and novel implement of agriculture, designed to be used in gathering or drawing hay up in proximity to a stack or barn where it is to be stored from the meadow round about; and to enable those skilled in the art to understand how to construct and use my said invention, I will proceed to describe the construction and mode of operating the same with particularity, making reference, in so doing, to the aforesaid drawings, in which—

Figure 1 represents a plan or top view of my invention; Fig. 2, a front elevation of the same; and Fig. 3 is an end elevation or view thereof.

Similar letters of reference in the several figures in the drawings denote the same parts of my invention.

A B represent two pieces of wood about twelve feet long and of any suitable dimensions, forming, with the vertical rods or slats $a$, which are about two feet and three inches long, an upright rack, as shown.

The lower timber, A, which rests upon the ground, is provided with a series of teeth, F, in the same manner as a rake, projecting each way from the head A about two feet and six inches. The teeth at each end and at the center lie flush with the lower side of the head, forming runners, as it were, to facilitate the movement of the implement over the ground. At each end of the said implement are pivoted the bars C, which are secured by passing the rods $r$ through their ends, and which are connected at their front ends by the vertical bar D, and are also further braced and strengthened by the bar E. G represents clevises, whereunto the horses are attached to the machine.

One or two horses may be attached to each end of the machine in any suitable manner, and being driven separately draw the same along upon the ground in the line of the windrows or cocks of hay, gathering and moving up to the stack from ten to fifteen hundred pounds of hay at a single sweep without the use of a fork.

When the hay has been deposited in the desired position the horses are turned each way, swinging the draft-arms C around, as shown in dotted lines in Fig. 1, and move off for another load, the machine being constructed so as to operate each way with the same facility.

The draft-arms C are about five feet six inches long; but I do not mean to limit myself to the dimensions herein specified, as they may be varied at pleasure without affecting the principle of my invention.

It will be observed that the upright pieces D, whereunto the clevises are secured, are provided with a series of holes, $e\ e$, so as to enable the clevis to be attached at any required height, thus regulating the tendency of the front teeth downward, which regulation is very important; as different circumstances and the character of the surface of the ground demand a variation in this respect, in order to render the machine successful in its operation.

Having described the construction and operation of my invention, I will now specify what I claim and desire to secure by Letters Patent.

I claim—

The combination of the bars A B, uprights $a$, teeth F, arms C C, and connecting-bars D D, provided with a series of holes, $e$, all arranged and operating substantially in the manner and for the purposes specified and set forth.

SAMUEL CARPENTER.

Witnesses:
  A. BRUCE,
  C. A. MILLER.